United States Patent
Takayama et al.

(10) Patent No.: US 6,384,944 B1
(45) Date of Patent: May 7, 2002

(54) INTEGRAL TRANSMITTER-RECEIVER OPTICAL COMMUNICATION APPARATUS

(75) Inventors: Homu Takayama, Saitama; Tatsuo Gotoh, Tokyo; Yoichi Kojima, Saitama; Masakazu Yamagata, Saitama; Shunichiro Wakamiya, Saitama, all of (JP)

(73) Assignee: Asahi Seimitsu Kabushiki Kaisha, Tokyo (JP)

(*) Notice: Subject to any disclaimer, the term of this patent is extended or adjusted under 35 U.S.C. 154(b) by 0 days.

(21) Appl. No.: 09/356,456

(22) Filed: Jul. 19, 1999

(30) Foreign Application Priority Data

Jul. 21, 1998 (JP) .......................................... 10-204551
Mar. 25, 1999 (JP) .......................................... 11-081376

(51) Int. Cl.$^7$ ............................................... H04B 10/00
(52) U.S. Cl. ...................... 359/152; 359/153; 359/156; 359/159; 359/172
(58) Field of Search ............................ 359/152, 153, 359/156, 159, 172

(56) References Cited

U.S. PATENT DOCUMENTS

| | | | |
|---|---|---|---|
| 5,373,437 A | | 12/1994 | Itoh et al. |
| 5,594,580 A | * | 1/1997 | Sakanaka et al. ............ 359/172 |
| 5,689,354 A | * | 11/1997 | Orino .......................... 359/172 |
| 6,178,024 B1 | * | 1/2001 | Degura ........................ 359/159 |

* cited by examiner

Primary Examiner—Jason Chan
Assistant Examiner—Hanh Phan
(74) Attorney, Agent, or Firm—Greenblum & Bernstein, P.L.C.

(57) ABSTRACT

Disclosed is an integral transmitter-receiver optical communication apparatus, including: a transmitter-receiver device which includes: a transmitter having a laser source for emitting a laser beam modulated in accordance with a transmission information signal, a receiver having a position detecting sensor and a light receiving element which receive a complementing modulated laser beam transmitted from a complementing transmitter, and a beam splitting device for splitting the modulated laser beam and the complementing modulated laser beam which are incident thereon as two separate laser beams; a telescopic optical system for transmitting the modulated laser beam emitted by the laser source and for receiving the complementing modulated laser beam transmitted from the complementing transmitter; and a light beam deflecting device positioned between the telescopic optical system and the transmitter-receiver device, wherein the light beam deflecting device is controlled in accordance with a signal output from the position detecting sensor.

11 Claims, 5 Drawing Sheets

# INTEGRAL TRANSMITTER-RECEIVER OPTICAL COMMUNICATION APPARATUS

BACKGROUND OF THE INVENTION

1. Field of the Invention

The present invention relates to an optical communication apparatus, and more specifically to an integral transmitter-receiver optical communication apparatus which is commonly used for both transmitting and receiving signals in the form of a laser beam modulated in accordance with an information signal.

2. Description of the Related Art

FIG. 5 shows an integral transmitter-receiver optical communication apparatus as an example to which the present invention is applicable. This optical communication apparatus includes a telescopic optical system 10, a light beam deflecting device 20 and a transmitter-receiver unit 30. The telescopic optical system 10 is used for both projecting and receiving a laser beam modulated by the information signal. In this illustrated example, the telescopic optical system 10 is constructed as a reflecting telescope. The light beam deflecting device 20 is positioned between the telescopic optical system 10 and the transmitter-receiver unit 30 to adjust the direction of the receiving light which enters the transmitter-receiver unit 30 through the telescopic optical system 10 and also the direction of the transmitting light which is emitted from the transmitter-receiver unit 30 to the telescopic optical system 10.

The transmitter-receiver unit 30 is provided with a semiconductor laser source 32 which emits a laser beam modulated by the modulator 31 in accordance with a transmission information signal. The semiconductor laser source 32 is constructed to emit the modulated laser beam so that S-polarized light thereof is reflected. The transmitter-receiver unit 30 is further provided with a polarization beam splitter (PBS) 33 on which the linearly polarized light emitted from the semiconductor laser source 32 is incident. The polarization beam splitter 33 reflects S-polarized light while allowing P-polarized light to pass therethrough. The S-polarized light that is reflected by the polarization beam splitter 33 is incident on the light beam deflecting device 20 via a λ/4 retardation plate 34. The transmitter-receiver unit 30 is further provided, on a transmission light path of the polarization beam splitter 33, with a beam splitter 35 in order to receive the light signal transmitted from a complementing optical transmitter, which is positioned opposite to the optical communication apparatus. A light receiving element 36 and a position detecting sensor 37, each of which receives a modulated laser beam, are respectively positioned on two separate light paths split by the beam splitter 35. Accordingly, the light emitted by the aforementioned complementing optical transmitter to be received by the telescopic optical system 10 is turned into P-polarized light through the λ/4 retardation plate 34. Subsequently, the P-polarized light passes through the polarization beam splitter 33 and then enters the beam splitter 35 to be split into two separate light beams so that the two separate light beams are incident on the light receiving element 36 and the position detecting sensor 37, respectively. A signal processing circuit 38 is connected to the light receiving element 36 to read out the information conveyed by the light received by the light receiving element 36.

The integral transmitter-receiver optical communication apparatus having the aforementioned structure is generally positioned opposite to the semiconductor laser beam of a complementing optical communication apparatus having an identical structure, wherein the transmission range of the laser beam emitted by the semiconductor laser beam 32 overlaps the transmission range of the semiconductor laser beam emitted by the complementing optical communication apparatus, so that the laser beam modulated by the modulator 31 can be received by the light receiving element 36 in each of the mutually complementing optical communication apparatuses.

In each of the mutually complementing optical communication apparatuses, the light beam deflecting device 20 maintains the parallelism of the transmitting laser beam which is incident thereon to be deflected outwards through the telescopic optical system 10, and also the parallelism of the received laser beam (which is emitted by the complementing optical communication apparatus) to be incident on the light beam deflecting device 20. The light beam deflecting device 20 can include a rotatable deflection mirror which can be driven about two axes (X and Y axes) which are orthogonal to each other. A rotational portion of the rotatable deflection mirror is coupled to an electromagnetic driver which includes coils and permanent magnets. This electromagnetic driver is driven in accordance with signals output from the position detecting sensor 37. The position detecting sensor 37 detects the variation in the position of the receiving light which enters the transmitter-receiver unit 30 to output a drive command signal to the electromagnetic driver through a controller 21 and an X/Y driver 22 to rotate the deflection mirror 20 about the X-axis and the Y-axis thereof, so that the receiving light enters the transmitter-receiver unit 30 at an appropriate position. The position of the deflection mirror 20 continues to be detected by the position detecting sensor 37 in a feed-back operation so that the parallelism of both the light transmitted by the transmitter and the light received by the receiver are maintained.

In the conceptual structure of the integral transmitter-receiver optical communication apparatus shown in FIG. 5, crosstalk does not occur, in theory, between the transmitting laser beam emitted from the semiconductor laser source 32 and the received laser beam incident upon the light receiving element 36 and the position detecting sensor 37. However, in practice, there is a possibility of such crosstalk occurring due to the polarization beam splitter 33 not being able to perfectly polarize the incident light (in fact, it is practically impossible to provide a polarization beam splitter having a polarization beam splitting thin layer therein through which the incident light is perfectly polarized, and hence, the occurrence of a small percentage of infiltrating (stray) light cannot be prevented), and/or due to the polarization beam splitter 33 and the beam splitter 35 being positioned very closely to each other.

SUMMARY OF THE INVENTION

The primary object of the present invention is to provide an integral transmitter-receiver optical communication apparatus, wherein the occurrence of a crosstalk between the transmitting light and the receiving light can be prevented. A more specific object of the present invention is to provide an integral transmitter-receiver optical communication apparatus wherein the transmitting light can be prevented from entering the side of the receiver, in the case where a polarization beam splitter and a beam splitter (i.e., a polarization beam splitting plane and a beam splitting plane) are positioned adjacent to each other.

To achieve the above-mentioned objects, according to the present invention, there is provided an integral transmitter-receiver optical communication apparatus, including: a transmitter-receiver device which includes: a transmitter having a laser source for emitting a laser beam modulated in accordance with a transmission information signal, a receiver having a position detecting sensor and a light receiving element which receive a complementing modulated laser beam transmitted from a complementing transmitter, and a beam splitting device for splitting the modulated laser beam and the complementing modulated laser beam which are incident thereon as two separate laser beams; a telescopic optical system for transmitting the modulated laser beam emitted by the laser source and for receiving the complementing modulated laser beam transmitted from the complementing transmitter; and a light beam deflecting device positioned between the telescopic optical system and the transmitter-receiver device, wherein the light beam deflecting device is controlled in accordance with a signal output from the position detecting sensor. The beam splitting device includes: in order from the light beam deflecting device side, a polarization beam splitting plane which allows a first linearly polarized laser beam of the modulated laser beam emitted from the laser source to pass therethrough to proceed towards the light beam deflecting device, and reflects a second linearly polarized laser beam of the complementing modulated laser beam transmitted from the complementing transmitter, the second linearly polarized laser beam having a phase different from a phase of the first linearly polarized laser beam by 90 degrees; and a beam splitting plane for splitting the second linearly polarized laser beam reflected by the polarization beam splitting plane into two separate laser beams to be respectively received by the position detecting sensor and the light receiving element. The modulated laser beam emitted from the laser source has a non-circular shape of intensity distribution, a first length in a θ-parallel direction of a cross section taken along a plane perpendicular to the modulated laser beam being shorter than a second length in a θ-perpendicular direction of the cross section, the first length and the second length extending perpendicularly to each other; and wherein the orientation of the laser source is determined so that the θ-parallel direction becomes substantially parallel to an optical axis extending from the polarization beam splitting plane to the beam splitting plane.

Preferably, the polarization beam splitting plane and the beam splitting plane are respectively formed on first and second planes of a common prism which are orthogonal to each other.

Preferably, an afocal optical system positioned between the light beam deflecting device and the transmitter-receiver device is also provided.

Preferably, the transmitter-receiver device includes a λ/4 retardation plate positioned between the afocal optical system and the polarization beam splitting plane.

Preferably, the light beam deflecting device includes an adjustable deflection mirror that is driven in accordance with the signal output from the position detecting sensor.

Preferably, the transmitter-receiver device includes a band-pass filter between the beam splitting plane and the light receiving element.

Preferably, the transmitter-receiver device includes a band-pass filter between the beam splitting plane and the position detecting sensor.

Preferably, the polarization beam splitting plane and the beam splitting plane are formed on the prism apart from each other by a predetermined distance.

Preferably, a casing is further provided in which the prism having the polarization beam splitting plane and the beam splitting plane is supported, the casing being provided with a light interceptive wall positioned around a boarder between the polarization beam splitting plane and the beam splitting plane.

Preferably, a casing in which the prism having the polarization beam splitting plane and the beam splitting plane is supported, the casing being provided, on a light path of the polarization beam splitting plane, with an opening for allowing light which is emitted from the semiconductor laser source to be reflected by the polarization beam splitting plane to exit the casing.

According to another aspect of the present invention, there is provided an integral transmitter-receiver optical communication apparatus, including: a laser source for emitting a laser beam modulated by transmission information signal; a telescopic optical system for transmitting the modulated laser beam and for receiving a complementing modulated laser beam transmitted from a complementing transmitter; a position detecting sensor; a light receiving element; a polarization beam splitting plane positioned between the laser source and the telescopic optical system; an adjustable deflection mirror positioned between the telescopic optical system and the polarization beam splitting plane and driven in accordance with a signal output from the position detecting sensor; and a beam splitting plane positioned adjacent to the polarization beam splitting plane for splitting a laser beam reflected by the polarization beam splitting plane into two separate laser beams to be respectively received by the light receiving element and the position detecting sensor. The polarization beam splitting plane allows a first linearly polarized laser beam of the modulated laser beam emitted from the laser source to pass therethrough to proceed towards the deflecting mirror, and reflects a second linearly polarized laser beam of the complementing modulated laser beam transmitted from the complementing transmitter, the second linearly polarized laser beam having a phase different from a phase of the first linearly polarized laser beam by 90 degrees. The beam splitting plane splits the second linearly polarized laser beam reflected by the polarization beam splitting plane into two separate laser beams to be respectively received by the light receiving element and the position detecting sensor. The modulated laser beam emitted from the laser source has a non-circular shape of intensity distribution, a first length in the θ-parallel direction of a cross section taken along a plane perpendicular to the modulated laser beam being shorter than a second length in the θ-perpendicular direction of the cross section, the first length and the second length extending perpendicularly to each other. The orientation of the laser source is determined so that the θ-parallel direction becomes substantially parallel to an optical axis extending from the polarization beam splitting plane to the beam splitting plane.

The present disclosure relates to subject matter contained in Japanese Patent Application Nos. 10-204551 (filed on Jul. 21, 1998) and 11-81376 (filed on Mar. 25, 1999) which are expressly incorporated herein by reference in their entireties.

BRIEF DESCRIPTION OF THE DRAWINGS

The present invention will be discussed below in detail with reference to the accompanying drawings in which.

DESCRIPTION OF THE PREFERRED EMBODIMENT

Figure 1:
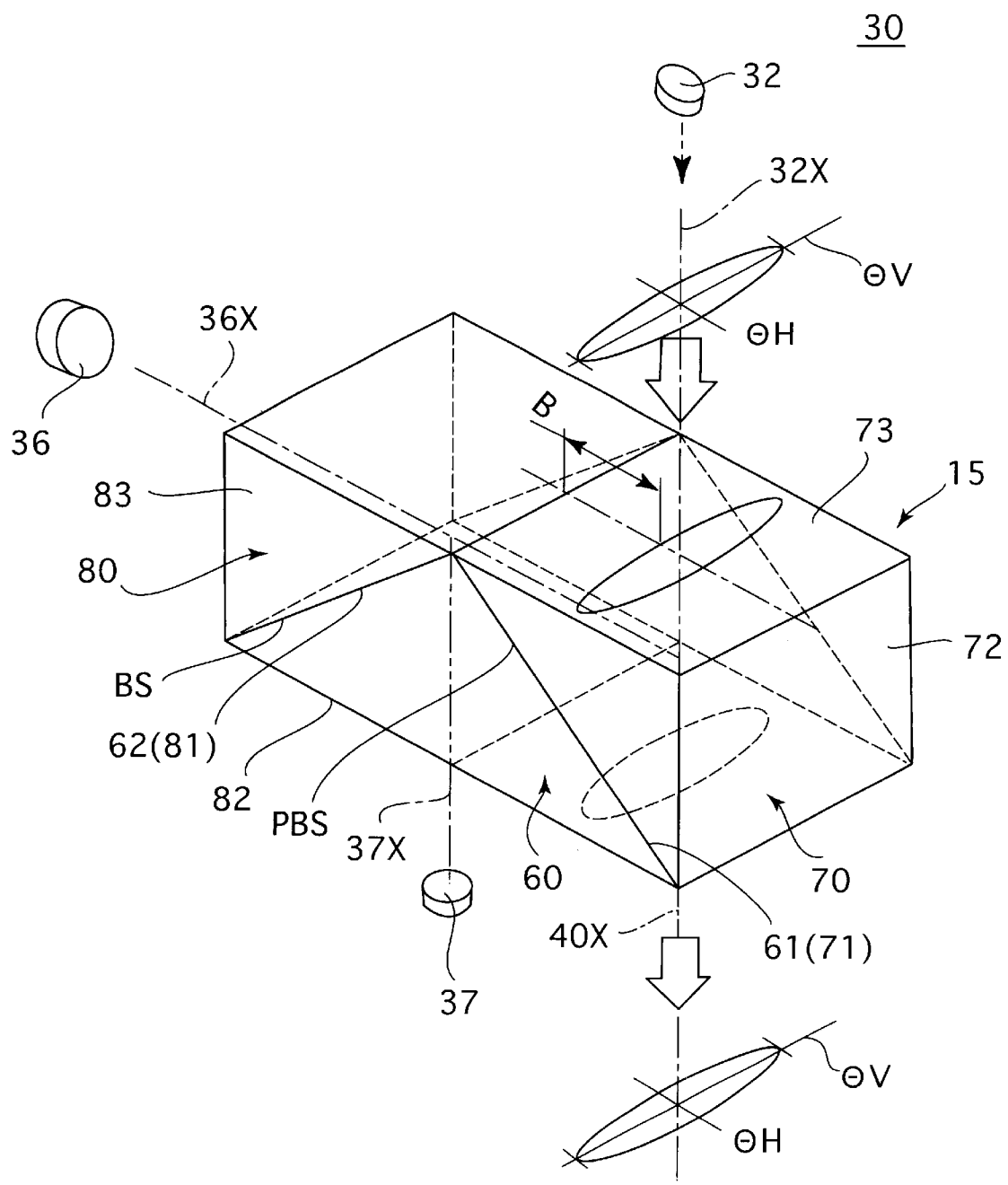
FIG. 1 is a perspective view of the fundamental elements of the first embodiment of the transmitter-receiver unit of an integral transmitter-receiver optical communication apparatus to which the present invention is applied.
Figure 2:
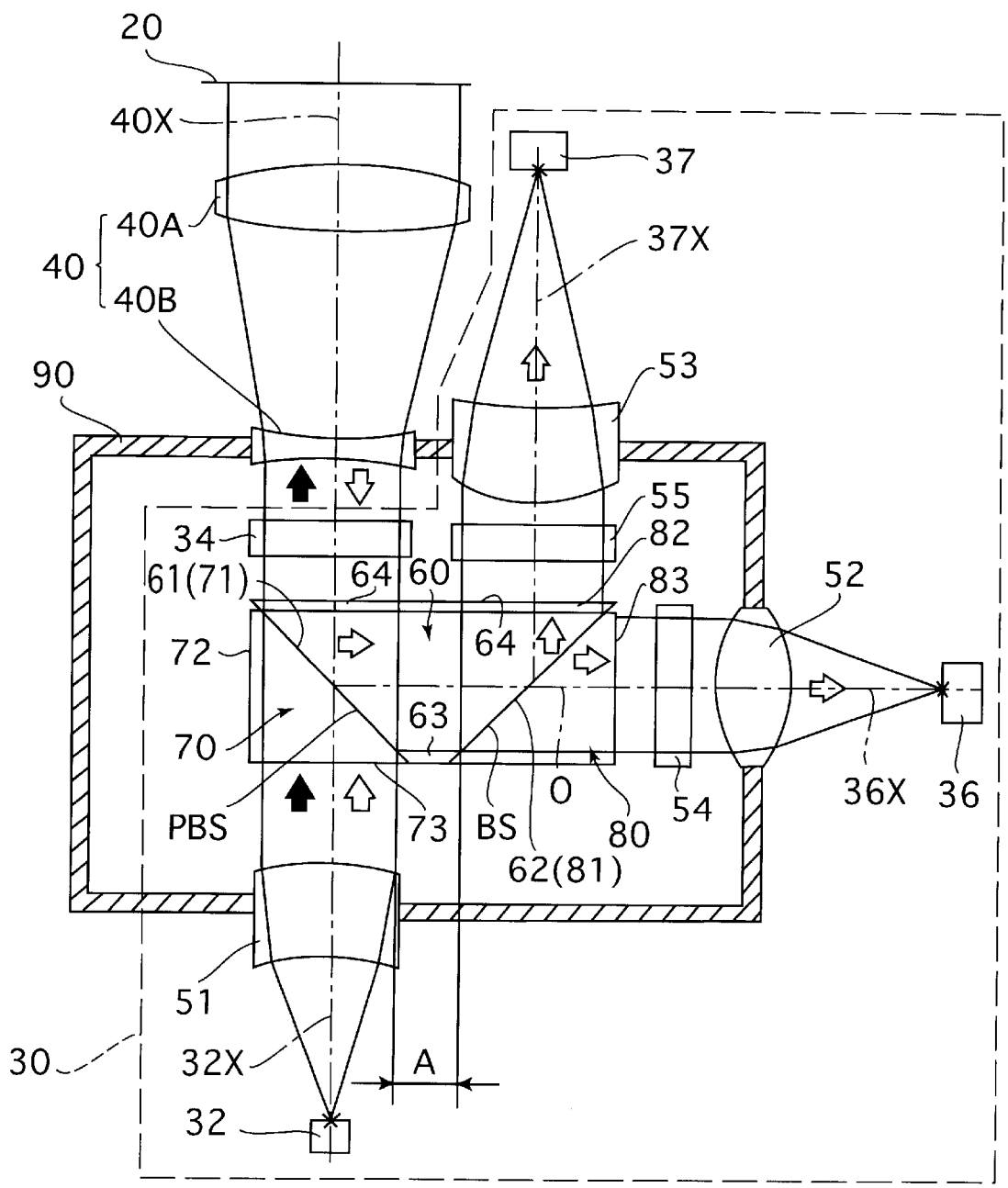
FIG. 2 is a cross sectional view of the fundamental elements of the first embodiment of the transmitter-receiver unit shown in FIG. 1.
Figure 5:
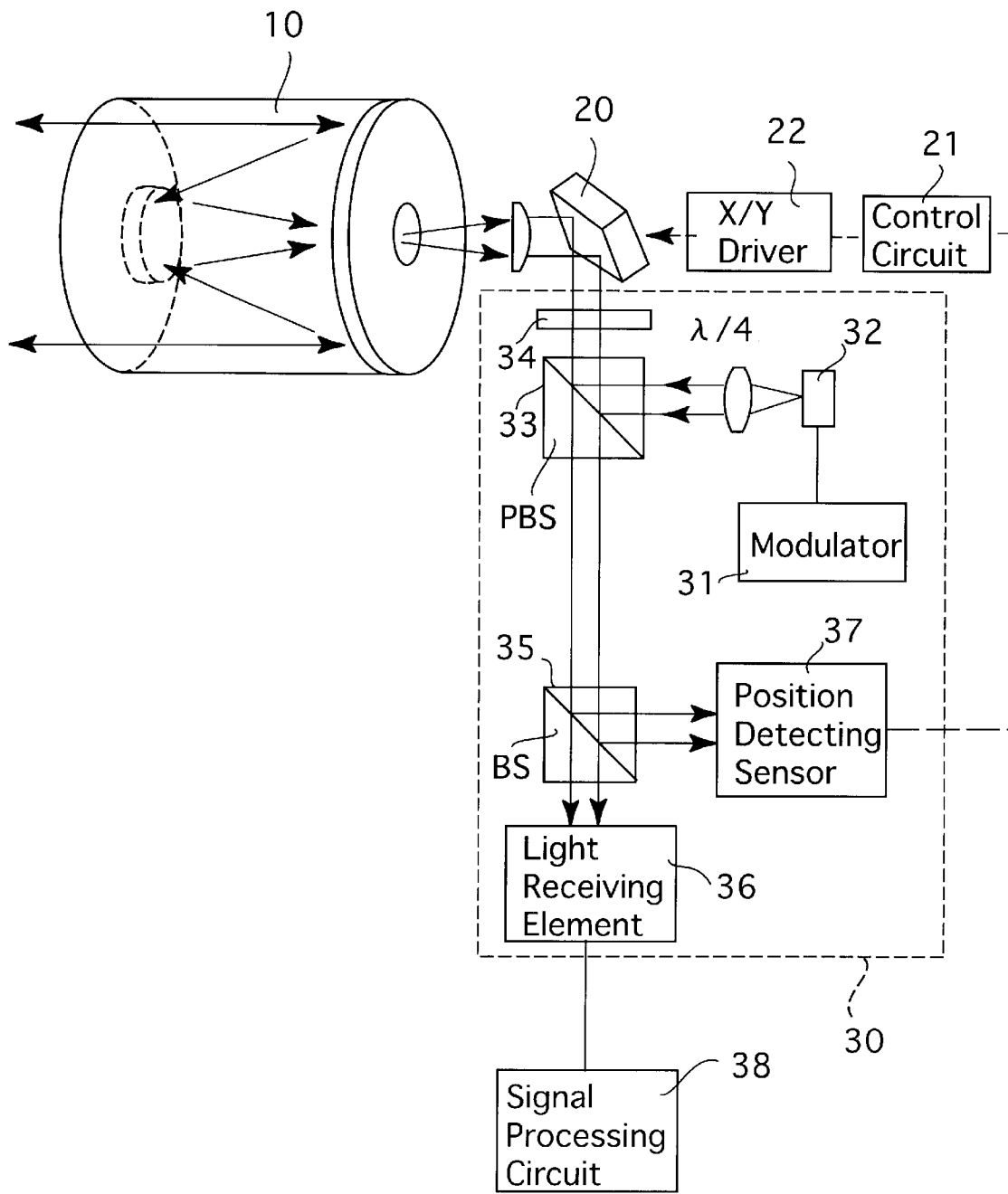
FIG. 5 is a schematic illustration showing an example of a conventional integral transmitter-receiver optical communication apparatus.

FIGS. 1 and 2 show the fundamental elements of the first embodiment of a transmitter-receiver unit (transmitter-receiver device) 30 of an integral transmitter-receiver optical communication apparatus to which the present invention is applied. In FIGS. 1 and 2, members or elements similar to those shown in FIG. 5 have the same reference designators. As shown in FIG. 2, the first embodiment of the optical communication apparatus is provided between the deflection mirror 20 and the transmitter-receiver unit 30 with a second afocal optical system 40. The second afocal optical system 40 includes a first lens group 40A having a positive power and a second lens group 40B having a negative power, in this order from the deflection mirror 20 side in a direction toward the transmitter-receiver unit 30. The second afocal optical system 40 is an optical system of zero convergent power, whose focal points are infinitely distant, so that the light beam which exits from the second afocal optical system 40 remains as a substantially parallel beam if the light beam which enters the second afocal optical system 40 is a parallel beam. However, the beam diameter of the light beam incident on the second afocal optical system is reduced therethrough in the direction from the object side to the transmitter-receiver unit 30 side. The reduction ratio of the diameter (magnification) of the telescopic optical system (i.e., the first afocal optical system) 10 can be set to a ratio of approximately one to four (four times), while the reduction ratio of the diameter (magnification) of the second afocal optical system 40 can be set to a ratio of approximately one to two (two times).

The transmitter-receiver unit 30 is provided with a beam splitting unit (beam splitting device) 15 which includes a central prism 60 and a couple of auxiliary prisms 70 and 80. Each of the central prism 60 and the couple of auxiliary prisms 70 and 80 is a right-angle prism. The central prism 60 includes two adhesive surfaces 61 and 62, which are angled relative to each other by a right angle (90 degrees). Each of the two adhesive surfaces 61 and 62 is angled relative to an optical axis 40X of the second afocal optical system 40 by 45 degrees. The auxiliary prism 70 includes an adhesive surface 71 which is attached to the adhesive surface 61 by an adhesive. The auxiliary prism 70 further includes incident/exit surfaces 72 and 73 which are angled relative to each other by a right angle, while each of the incident/exit surfaces 72 and 73 is angled relative to the adhesive surface 71 by 45 degrees. Likewise, the auxiliary prism 80 includes an adhesive surface 81 which is attached to the adhesive surface 62 by an adhesive. The auxiliary prism 80 further includes incident/exit surfaces 82 and 83 which are angled relative to each other by a right angle, while each of the incident/exit surfaces 82 and 83 is angled relative to the adhesive surface 81 by 45 degrees. In the illustrated embodiment shown in FIG. 2, the central prism 60 is provided with flat surfaces 63 and 64 which extend parallel to an optical axis O. Each of the flat surfaces 63 and 64 is angled relative to each of the adhesive surfaces 61 and 62 by 45 degrees. The flat surface 63, which is narrower than the flat surface 64, separates the adhesive surface 61 apart from the adhesive surface 62 in the direction of the optical axis 36X of the light receiving element 36 by a distance "A" shown in FIG. 2.

A polarization beam splitting thin layer is interposed between the adhesive surface 61 of the central prism 60 and the adhesive surface 71 of the auxiliary prism 70 to form a polarization beam splitting plane PBS therebetween. Likewise, a beam splitting thin layer is interposed between the adhesive surface 62 of the central prism 60 and the adhesive surface 81 of the auxiliary prism 80 to form the beam splitting plane BS therebetween. The polarization beam splitting plane PBS is angled relative to the optical axis 40X of the second afocal optical system 40 and the optical axis 32X of the semiconductor laser source 32 by 45 degrees. The beam splitting plane BS is angled relative to the optical axis 40X of the second afocal optical system 40 and the optical axis 37X of the position detecting sensor 37 by 45 degrees. The optical axis 32X of the light receiving element 32 is coincident with the optical axis 40X of the second afocal optical system 40.

As shown in FIG. 2, a collimator lens 51 for collimating the laser beam emitted from the semiconductor laser source 32 is positioned on the optical axis 32X of the semiconductor laser source 32. A condenser lens 52 for focusing the received parallel beam on the light receiving element 36 and a band-pass filter 54 are positioned on the optical axis 36X of the light receiving element 36. A condenser lens 53 for focusing the received parallel beam on the light receiving element 37 and a band-pass filter 55 are positioned on the optical axis 37X of the position detecting sensor 37. The incident surfaces 72 and 73 of the auxiliary prism 70 extend perpendicular to the optical axis 36X and the optical axis 32X, respectively, while the incident surfaces 82 and 83 of the auxiliary prism 80 extend perpendicular to the optical axis 37X and the optical axis 36X, respectively. The locations of the light receiving element 36 and the position detecting sensor 37 can be exchanged. It should be noted that the cemented auxiliary prisms 70 and 80 are supported by a casing 90 therein by a supporting member which is not shown in either FIG. 1 or 2. In addition, it should be noted that the lenses 51, 52 and 53, and the filters 54 and 55 have been omitted in FIG. 1.

A laser beam emitted from the semiconductor laser source 32 is incident on the incident surface 73 of the auxiliary prism 70, which is positioned within the transmitter-receiver unit 30. As shown schematically in FIG. 1, the laser beam emitted from the semiconductor laser source 32 has a linear or elliptic shaped intensity distribution, rather than a circular-shaped intensity distribution. Namely, in a cross section taken along a plane which is perpendicular to the laser beam emitted from the semiconductor laser source 32, the length θH (shorter-axis direction) in a direction parallel (θ-parallel) to the optical axis 36X is shorter than the length θV (longer-axis direction) in a direction perpendicular (θ-perpendicular) to the optical axis 36X. The θ-parallel direction of length θH is the direction of the linear polarization. The orientation of the semiconductor laser source 32 is determined by rotating the semiconductor laser source 32 about the optical axis 32X so that the θ-parallel direction of length θH becomes substantially parallel to the optical axis extending from the polarization beam splitting plane PBS to the beam splitting plane BS. Various conditions of the polarization beam splitting plane PBS, formed between the adhesive surface 61 of the central prism 60 and the adhesive surface 71 of the auxiliary prism 70, are determined so that the polarization beam splitting plane PBS becomes a plane which reflects S-polarized light while allowing P-polarized light to pass therethrough. Namely, the polarization beam splitting plane allows the linearly polarized laser beam emitted from the semiconductor laser beam 32 (positioned as described above) to pass through the polarization beam splitting plane PBS while reflecting a linearly polarized laser beam whose phase is different from the linearly polarized laser beam emitted from the semiconductor laser beam 32 by 90 degrees. The λ/4 retardation plate 34 is provided for changing the P-polarize d light received from the complementing optical communication apparatus into S-polarized light by rotating the plane of polarization of the incident laser beam by 90 degrees.

The integral transmitter-receiver optical communication apparatus having the above mentioned structure is utilized in a manner similar to a conventional integral transmitter-receiver optical communication apparatus. Namely, the present embodiment of the optical communication apparatus is utilized by being positioned approximately opposite to the semiconductor laser beam of a complementing optical communication apparatus having an identical structure wherein the transmission range of the laser beam emitted by the semiconductor laser beam 32 overlaps the transmission range of the laser beam emitted by the semiconductor laser beam of the complementing optical communication apparatus, so that the laser beam modulated by the modulator 31 is received by the light receiving element 36 in both of the mutually complementing optical communication apparatuses. In this case, the possibility of the laser beam emitted from the semiconductor laser source 32 to be incident on the polarization beam splitting plane PBS may partly enter the side of the beam splitting plane BS is small because the θ-parallel direction of length θH of the incident laser beam extends substantially parallel to the optical axis which extends from the polarization beam splitting plane PBS to the beam splitting plane BS. Accordingly, as shown in FIG. 1, the possibility of crosstalk occurring becomes less, since the distance B between the incident laser beam and the boarder of the polarization beam splitting plane PBS and the beam splitting plane BS becomes large. This is apparent when comparing a case where the θ-perpendicular direction of length θV is oriented to extend substantially parallel to the optical axis which extends from the polarization beam splitting plane PBS to the beam splitting plane BS. Subsequently, the P-polarized light which is passed through the polarization beam splitting plane PBS is projected outwardly through the second afocal optical system 40, the deflection mirror 20 and the telescopic optical system 10, in that order. The laser beam emitted from the opposite optical communication apparatus is changed into S-polarized laser beam through the λ/4 retardation plate 34 to be then reflected by the polarization beam splitting plane PBS. Thereafter the laser beam reflected by the polarization beam splitting plane PBS is split into two beams to be respectively received by the position detecting sensor 37 and the light receiving element 36.

Furthermore, in the illustrated embodiment shown in FIG. 2, the central prism 60 is provided with the flat surface 63 which separates the adhesive surfaces 61 and 62 apart from each other in the direction of the optical axis 36X of the light receiving element 36, which reduces the possibility of the laser beam (emitted from the semiconductor laser source 32 to pass through the polarization beam splitting plane PBS) partly proceeding as infiltrating light towards the beam splitting plane BS to enter the position detecting sensor 37 and/or the light receiving element 36. Consequently, the occurrence of a crosstalk due to such infiltrating light can also be prevented.

Figure 3:
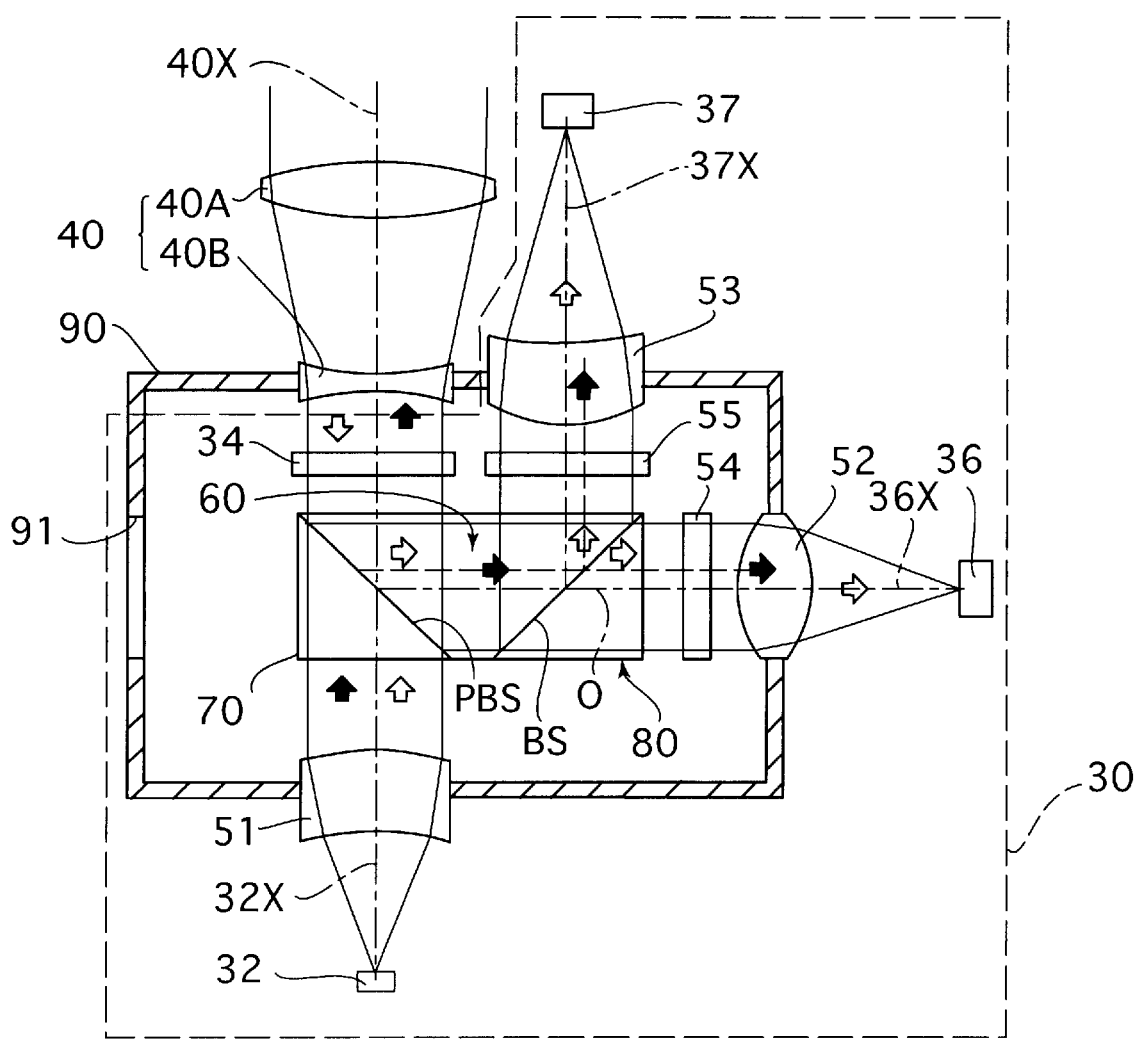
FIG. 3 is a cross sectional view of the fundamental elements of the second embodiment of the transmitter-receiver unit of an integral transmitter-receiver optical communication apparatus to which the present invention is applied.
Figure 4:
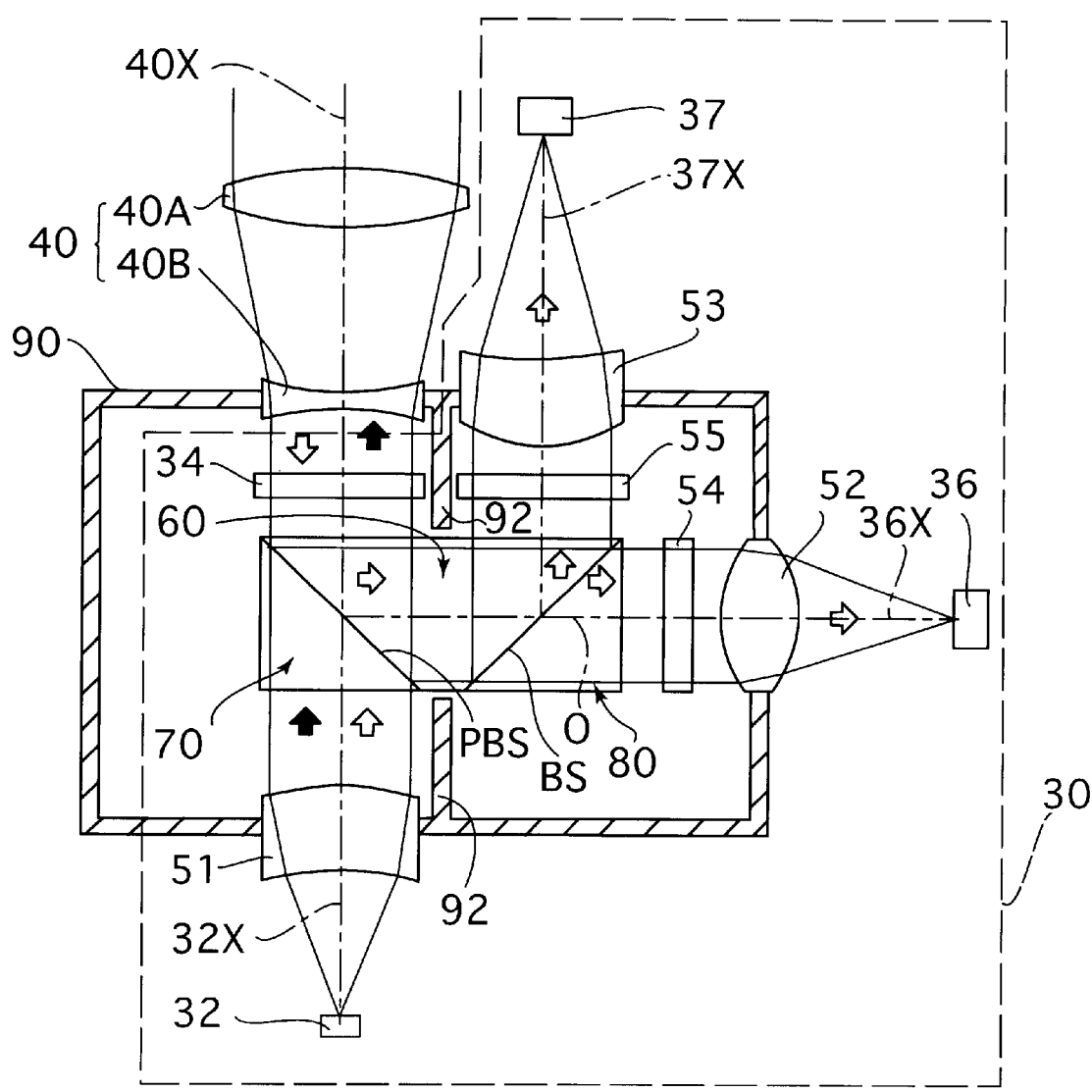
FIG. 4 is a cross sectional view of fundamental elements of the third embodiment of the transmitter-receiver unit of an integral transmitter-receiver optical communication apparatus to which the present invention is applied.

FIG. 3 shows fundamental elements of the second embodiment of the transmitter-receiver unit 30 which corresponds to that shown in FIG. 2, wherein the occurrence of a crosstalk due to the infiltrating light is prevented, while FIG. 4 shows fundamental elements of the third embodiment of the transmitter-receiver unit 30 which corresponds to that shown in FIG. 2, wherein the occurrence of a crosstalk due to the infiltrating light is prevented. In FIG. 3, the casing 90 is provided, on a light path of the polarization beam splitting plane PBS, with an opening 91 for positively allowing the light which is emitted from the semiconductor laser source 32 to be reflected by the polarization beam splitting plane PBS to exit the casing 90. In FIG. 4, the light which is emitted from the semiconductor laser source 32 to pass through the polarization beam splitting plane PBS is prevented from reaching either the position detecting sensor 37 or the light receiving element 36 by means of providing the casing 90 with a light interceptive wall 92 positioned around a boarder between the polarization beam splitting plane PBS and the beam splitting plane BS. The structures of the second and third embodiments are identical to that of the first embodiment except for the added opening 91 or the added wall 92, so that other members or elements in the second and third embodiments which are similar to those in the first embodiment are designated by the same reference numerals and therefore will not be herein discussed. The second and third embodiments can be combined; namely, the casing 90 can be provided with both the opening 91 and the wall 92. Furthermore, the orientation of the semiconductor laser source 32 and the set-up thereof in the first embodiment can be used together with the mechanical structures shown in FIGS. 2 through 4.

According to the above description, an integral transmitter-receiver optical communication apparatus has been provided, wherein the occurrence of a crosstalk between the transmitting light and the receiving light can be substantially prevented.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An integral transmitter-receiver optical communication apparatus, comprising:

a transmitter-receiver device comprising: a transmitter having a laser source for emitting a laser beam modulated in accordance with a transmission information signal; a receiver having a position detecting sensor and a light receiving element which receive a complementing modulated laser beam transmitted from a complementing transmitter; and a beam splitting device for splitting said modulated laser beam and said complementing modulated laser beam which are incident thereon as two separate laser beams;

a telescopic optical system for transmitting said modulated laser beam emitted by said laser source and for receiving said complementing modulated laser beam transmitted from said complementing transmitter; and a light beam deflecting device positioned between said telescopic optical system and said transmitter-receiver device, wherein said light beam deflecting device is controlled in accordance with a signal output from said position detecting sensor;

wherein said beam splitting device comprises: in order from the light beam deflecting device side, a polarization beam splitting plane which allows a first linearly polarized laser beam of said modulated laser beam emitted from said laser source to pass therethrough to proceed towards said light beam deflecting device, and reflects a second linearly polarized laser beam of said complementing modulated laser beam transmitted from said complementing transmitter, said second linearly polarized laser beam having a phase different from a phase of said first linearly polarized laser beam by 90 degrees; and a beam splitting plane for splitting said second linearly polarized laser beam reflected by said polarization beam splitting plane into two separate laser beams to be respectively received by said position detecting sensor and said light receiving element;

wherein said modulated laser beam emitted from said laser source has a non-circular shape of intensity distribution, a first length in a θ-parallel direction of a cross section taken along a plane perpendicular to said modulated laser beam being shorter than a second length in a θ-perpendicular direction of said cross section, said first length and said second length extending perpendicularly to each other; and wherein the orientation of said laser source is determined so that said θ-parallel direction becomes substantially parallel to an optical axis extending from said polarization beam splitting plane to said beam splitting plane.

2. The integral transmitter-receiver optical communication apparatus according to claim 1, wherein said polarization beam splitting plane and said beam splitting plane are respectively formed on first and second planes of a common prism which are orthogonal to each other.

3. The integral transmitter-receiver optical communication apparatus according to claim 2, wherein said polarization beam splitting plane and said beam splitting plane are formed on said prism apart from each other by a predetermined distance.

4. The integral transmitter-receiver optical communication apparatus according to claim 3, further comprising a casing in which said prism having the polarization beam splitting plane and the beam splitting plane is supported, said casing being provided with a light interceptive wall positioned around a boarder between the polarization beam splitting plane and the beam splitting plane.

5. The integral transmitter-receiver optical communication apparatus according to claim 2, further comprising a casing in which said prism having the polarization beam splitting plane and the beam splitting plane is supported, said casing being provided, on a light path of the polarization beam splitting plane, with an opening for allowing light which is emitted from the semiconductor laser source to be reflected by the polarization beam splitting plane to exit the casing.

6. The integral transmitter-receiver optical communication apparatus according to claim 1, further comprising an afocal optical system positioned between said light beam deflecting device and said transmitter-receiver device.

7. The integral transmitter-receiver optical communication apparatus according to claim 6, wherein said transmitter-receiver device comprises a λ/4 retardation plate positioned between said afocal optical system and said polarization beam splitting plane.

8. The integral transmitter-receiver optical communication apparatus according to claim 1, wherein said light beam deflecting device comprises an adjustable deflection mirror that is driven in accordance with said signal output from said position detecting sensor.

9. The integral transmitter-receiver optical communication apparatus according to claim 1, wherein said transmitter-receiver device comprises a band-pass filter between said beam splitting plane and said light receiving element.

10. The integral transmitter-receiver optical communication apparatus according to claim 1, wherein said transmitter-receiver device comprises a band-pass filter between said beam splitting plane and said position detecting sensor.

11. An integral transmitter-receiver optical communication apparatus, comprising:

a laser source for emitting a laser beam modulated by transmission information signal;

a telescopic optical system for transmitting said modulated laser beam and for receiving a complementing modulated laser beam transmitted from a complementing transmitter;

a position detecting sensor;

a light receiving element;

a polarization beam splitting plane positioned between said laser source and said telescopic optical system;

an adjustable deflection mirror positioned between said telescopic optical system and said polarization beam splitting plane and driven in accordance with a signal output from said position detecting sensor; and a beam splitting plane positioned adjacent to said polarization beam splitting plane for splitting a laser beam reflected by said polarization beam splitting plane into two separate laser beams to be respectively received by said light receiving element and said position detecting sensor;

wherein said polarization beam splitting plane allows a first linearly polarized laser beam of said modulated laser beam emitted from said laser source to pass therethrough to proceed towards said deflecting mirror, and reflects a second linearly polarized laser beam of said complementing modulated laser beam transmitted from said complementing transmitter, said second linearly polarized laser beam having a phase different from a phase of said first linearly polarized laser beam by 90 degrees;

wherein said beam splitting plane splits said second linearly polarized laser beam reflected by said polarization beam splitting plane into two separate laser beams to be respectively received by said light receiving element and said position detecting sensor;

wherein said modulated laser beam emitted from said laser source has a non-circular shape of intensity distribution, a first length in the θ-parallel direction of a cross section taken along a plane perpendicular to said modulated laser beam being shorter than a second length in the θ-perpendicular direction of said cross section, said first length and said second length extending perpendicularly to each other; and wherein the orientation of said laser source is determined so that said θ-parallel direction becomes substantially parallel to an optical axis extending from said polarization beam splitting plane to said beam splitting plane.

* * * * *